US008126104B2

(12) United States Patent
Schenter et al.

(10) Patent No.: US 8,126,104 B2
(45) Date of Patent: Feb. 28, 2012

(54) MEDICAL RADIOISOTOPES AND METHODS FOR PRODUCING THE SAME

(75) Inventors: Robert E. Schenter, Portland, OR (US); Dennis W. Wester, Richland, WA (US); Glenn W. Hollenberg, Kennewick, WA (US); Brian M. Rapko, Pasco, WA (US); Gregg J. Lumetta, Pasco, WA (US)

(73) Assignee: Battelle Memorial Institute, Richland, WA (US)

(*) Notice: Subject to any disclaimer, the term of this patent is extended or adjusted under 35 U.S.C. 154(b) by 295 days.

(21) Appl. No.: 11/659,394

(22) PCT Filed: Aug. 2, 2005

(86) PCT No.: PCT/US2005/027558

§ 371 (c)(1), (2), (4) Date: Oct. 2, 2008

(87) PCT Pub. No.: WO2006/028620

PCT Pub. Date: Mar. 16, 2006

(65) Prior Publication Data

US 2009/0060812 A1 Mar. 5, 2009

(51) Int. Cl.

| | |
|---|---|
| ***B01J 19/08*** | (2006.01) |
| ***C01G 39/00*** | (2006.01) |
| ***G21G 1/00*** | (2006.01) |
| ***G21G 1/04*** | (2006.01) |
| ***G21G 1/10*** | (2006.01) |

(52) U.S. Cl. .......................... 376/198; 423/249; 376/196

(58) Field of Classification Search .................. 423/249; 376/156, 157, 186, 190, 191, 196, 201; 250/430
See application file for complete search history.

(56) References Cited

U.S. PATENT DOCUMENTS

| | | | | |
|---|---|---|---|---|
| 2,887,357 | A * | 5/1959 | Seaborg et al. | 376/181 |
| 3,519,385 | A | 7/1970 | Hurst et al. | |
| 3,799,883 | A * | 3/1974 | Arino et al. | 252/645 |
| 3,940,318 | A | 2/1976 | Arino et al. | |
| 3,970,583 | A | 7/1976 | Panek-Finda | |
| 4,123,498 | A | 10/1978 | Rosenbaum et al. | |
| 4,158,700 | A | 6/1979 | Karageozian | |
| 4,206,358 | A | 6/1980 | Matthews et al. | |

(Continued)

FOREIGN PATENT DOCUMENTS

DE 272 726 10/1989

OTHER PUBLICATIONS

Bryant et al., "Excitation functions of reactions of 7- to 24-MeV $He^3$ [sic] ions with $Cu^{63}$ [sic] and $Cu^{65}$ [sic]," *Phys. Rev.* 130(4):1512-1522, 1963.

(Continued)

*Primary Examiner* — Jerry Lorengo
*Assistant Examiner* — Jared Wood
(74) *Attorney, Agent, or Firm* — Klarquist Sparkman, LLP

(57) ABSTRACT

This disclosure concerns a new method for preparing radioisotopes, such as molybdenum-99, by alpha particle irradiation, such as by alpha particle irradiation of zirconium-96. Molybdenum-99 is a precursor to the medically-significant radioisotope technetium-99m. Also disclosed are novel compositions containing one or more of technetium-99m, molybdenum-99 and zirconium species. Systems for producing molybdenum-99 and technetium-99m, including alpha particle generators and irradiation targets, also are described.

37 Claims, 5 Drawing Sheets

U.S. PATENT DOCUMENTS 4,239,970 A 12/1980 Eckhardt et al.
4,284,472 A 8/1981 Pomares et al.
4,567,025 A * 1/1986 Peterson et al. ........... 204/157.2
4,634,864 A * 1/1987 Lucatorto et al. ............. 250/282
4,782,231 A 11/1988 Svoboda et al.
4,837,110 A 6/1989 Kuhlmann et al.
5,178,738 A * 1/1993 Ishikawa et al. ......... 204/192.11
5,330,731 A 7/1994 Heaton et al.
5,512,256 A 4/1996 Bray et al.
5,615,238 A 3/1997 Wiencek et al.
5,774,782 A 6/1998 Mirzadeh et al.
5,782,742 A * 7/1998 Crocker et al. ................... 600/3
5,784,423 A 7/1998 Lidsky et al.
5,802,439 A 9/1998 Bennett et al.
5,848,110 A 12/1998 Maenchen et al.
5,891,531 A * 4/1999 Konishi et al. ................ 427/564
5,981,955 A 11/1999 Wong et al.
6,157,036 A 12/2000 Whiting et al.
6,160,862 A 12/2000 Wiencek et al.
6,208,704 B1 3/2001 Lidsky et al.
6,586,696 B1 * 7/2003 Pronko et al. ............ 204/157.22
6,804,319 B1 * 10/2004 Mirzadeh et al. ............. 376/189
6,845,137 B2 1/2005 Ruth et al.
6,907,106 B1 * 6/2005 McIntyre et al. ............... 378/68
2003/0219366 A1 11/2003 Horwitz et al.

OTHER PUBLICATIONS

Chowdhury et al., "Determination of cross section of α-induced nuclear reaction on natural Cr and Zr by stacked foil activation for thin layer activation analysis," *Nuclear Instruments and Methods in Physics Research B* 103:261-266, 1995.

Cristini et al., "Production of Molybdenum-99 From Low Enriched Uranium Targets," *2002 International Meeting on Reduced Enrichment for Research and Test Reactors*, 3 pages, Nov. 2002.

Das et al., "Studies on the feasibility of production of $^{57}$Co by alpha bombardment of Mn and Ni targets," *J. Radioanal. Nucl. Chem.* 111(2):469-475, 1987.

Denzler et al., "Excitation functions of α-particle induced nuclear reactions on highly enriched $^{92}$Mo: Comparative evaluation of production routes for $^{94m}$Tc," *Radiochim. Acta.* 68:13-20, 1995.

Donlevy et al., "Low Enrichment Mo-99 Target Development Program at ANSTO," *2002 International Meeting on Reduced Enrichment for Research and Test Reactors*, 9 pages, Nov. 2002.

Dubuc et al., "Medium-spin states in $^{99}$Mo," *Physical Review C* 37(3):954-962, 1988.

Ismail, "Measurement of excitation functions and means projected recoil ranges of nuclei in α-induced reactions on F, A1, V, Co and Re nuclei," *Pramana J. Phys.* 40:227-251, 1993.

Ji et al., "Product of various species on focused ion beam," *Review of Scientific Instruments* 73(2):822-824, 2002.

Knapp et al., "Nuclear Medicine Program Progress Report for Quarter Ending Jun. 30, 1991," *Oak Ridge National Laboratory*, 23 pages, Jun. 1991.

Kurz et al., "Measurement and equilibrium statistical-model calculation of excitation functions of the $^{197}$Au(α,χn) reactions in the energy range from 16 to 103 MeV," *Nucl. Phys. A* 168:139-138, 1971.

Lanzafame and Blann, "Reactions of $^{197}$Au with 19 to 100 MeV $^{4}$He ions: Equilibrium statistical model analyses," *Nucl. Phys. A* 142:545-558, 1970.

Lewis et al., "Comparison of gallium-66 purification methods for the development of automated processing systems," *Proceedings of the 8th Workshop on Targetry and Target Chemistry* pp. 120-123, 1999.

Lewis et al., "Production and purification of gallium-66 for preparation of tumor-targeting radiopharmaceuticals," *Nucl. Med. and Biol.* 29:701-706, 2002.

Nagame et al., "Production of $^{67}$Ga by alpha bombardment of natural zinc," *Int. J. Appl. Radiat. Isot.* 29:615-619, 1978.

Nagame et al., "Production of thallium-199 by alpha bombardment of gold," *Int. J. Appl. Radiat. Isot.* 30:669-672, 1979.

Peng et al., "Excitation functions and yields of the reactions induced by alpha-particle bombardment of natural silver," *Appl. Radiat. Isot.* 47:309-313, 1996.

Porile, "Excitation functions for alpha-induced reactions on zinc-64," *Phys. Rev.* 115(4):939-948, 1959.

Porile and Morrison, "Reactions of $Cu^{63}$ and $Cu^{65}$ with alpha particles," *Phys. Rev.* 116(5):1193-1200, 1959.

Porile et al., "Nuclear reactions of $Ga^{69}$ and $Ga^{71}$ with 13-56 MeV protons," *Nucle. Phys.* 43:500-522, 1963.

Ragland et al., "Magnetic moment of the first excited state of $^{99}$Mo," *Physical Review C* 37(3):2494-2497, 1978.

Sekine et al., "Separation of carrier free $^{95m}$Tc from niobium targets irradiated with alpha-particles," *J. Radioanal. Nucl. Chem.* 239(3):483-487, 1999.

Silvester and Thakur, "Cyclotron production of carrier-free gallium-67," *Int. J. Appl. Radiat. Isot.* 21:630-631, 1970.

Szelecsényi et al., "Production possibility of $^{60,61,62}$Cu radioisotopes by alpha induced reactions on cobalt for PET studies," *Nuclear Instruments and Methods in Physics Research B* 187:153-163, 2002.

Vekić et al., "Production of I-123 by alpha-bombardment of natural antimony," *Radiochem. Radioanal. Lett.* 47(1-2):35-44, 1981.

Vlatkovic et al., "Production of $^{67}$Ga by deuteron irradiation of zinc," *Int. J. Appl. Radiat. Isot.* 26:377-379, 1975.

Wilbur et al., "Reagents for Astatination of Biomolecules: Comparison of the in Vivo Distribution and Stability of Some Radioiodinated. Astatinated Benzamidyl and *nido*-Carboranyl Compounds," *Bioconjugate Chem.* 15:203-223, 2004.

Wilbur et al., "Biotin Reagents in Antibody Pretargeting. G. Synthesis and in Vivo Evaluation of Astatinated and Radioiodinated Aryl- and *nido*-Carboranyl-biotin Derivatives," *Bioconjugate Chem.* 15:601-616, 2004.

Zalutsky et al., "High-Level Production of α-Particle-Emitting $^{211}$At and Preparation of $^{211}$At-Labeled Antibodies for Clinical Use," *The Journal of Nuclear Medicine* 42(10):1508-1515, 2001.

International Search Report from International Application No. PCT/US2005/027558.

* cited by examiner

MEDICAL RADIOISOTOPES AND METHODS FOR PRODUCING THE SAME

CROSS REFERENCE TO RELATED APPLICATIONS

This is the U.S. National Stage of International Application No. PCT/US2005/027558, filed Aug. 2, 2005, which was published in English under PCT Article 21(2), which claims priority from U.S. application Ser. No. 10/911,407, filed Aug. 2, 2004, which is incorporated herein by reference.

FIELD

Disclosed are methods and apparatus for producing radioisotopes, such as molybdenum-99, as well as novel compositions produced according to the methods.

BACKGROUND

Radioisotopes have significant utility for a wide range of medical applications. For example, technetium-99m is a primary radioisotope employed in diagnostic nuclear medicine. The importance of technetium-99m to clinical procedures is highlighted by the fact that more than 13 million diagnostic procedures using technetium-99m are performed each year in the United States alone.

Technetium-99m has a combination of desirable physical properties, including its gamma decay mode and energy, that are ideally suited for single photon emission computed tomography. Moreover, technetium's chemical reactivity and versatility allow it to be conveniently complexed to carrier or targeting agents, such as antibodies, peptides, and other molecules, which allows particular tissues to be selectively imaged or scanned. Because technetium-99m has a short half-life ($t_{1/2}$=6 h), this radioisotope, when used in clinical practice, is typically produced from its longer-lived parent nuclide, molybdenum-99 ($t_{1/2}$=66 h) using a chromatographic column generator. For an example of a molybdenum-99/technetium-99m generator, see U.S. Pat. No. 5,774,782 to Mirzadeh et al. Removing the technetium-99m daughter nuclide from the generator (i.e., separating it from molybdenum) is typically performed by "milking" the generator a few times daily by pulling normal saline through the column to elute the soluble technetium-99m for complexation in "kits" for subsequent patient injection.

Commercial quantities of molybdenum-99 have been produced in nuclear reactors over the years through the uranium fission process (for example, see U.S. Pat. No. 3,799,883 to Arino et al.) utilizing highly enriched uranium-235 that requires extensive security and non-proliferation safeguards. Unfortunately, the fission process, whether it is based on low or high enriched uranium, yields only a small amount of molybdenum-99 with a large array of undesirable fission products that present significant infrastructure, health and security, liability, handling, storage, and waste issues and associated costs. Further, this mode of production requires dedicated and reliable nuclear reactors, support facilities and operation thereof to maintain a continuous supply. The United States currently depends solely on a limited number of foreign suppliers of molybdenum-99.

SUMMARY

Disclosed herein are radioisotope compositions, including molybdenum-99 compositions, as well as novel methods, apparatus and systems for producing such compositions.

Some of the disclosed methods for producing molybdenum-99 compositions include providing a zirconium-96-containing starting material, such as a starting material enriched in zirconium-96. The zirconium-96-containing starting material can be manufactured or otherwise formed into a target. The target can be irradiated with charged particles to transmute material in the target into molybdenum-99. The molybdenum-99 then can be separated from the target material. Alternatively, the zirconium-96-containing starting material can be irradiated without being formed into a target prior to irradiation.

Certain embodiments of the disclosed methods include removing the irradiated material from the target, for example by ionization, ablation, spallation, sputtering, and/or mechanical removal, such as milling. These and other embodiments also can include partially or completely dissolving the irradiated material to produce an irradiated target solution. Harvesting the irradiated material from the target can be performed during irradiation, following irradiation, or both. Separation of the desired species, such as the desired molybdenum-containing species, from other species can be accomplished by any suitable process, such as chemical separation, mass difference separation, plasma separation, (e.g., diffusion, centrifugation, and/or mass spectrometry) or combinations thereof. In a particular embodiment, harvesting molybdenum-99 includes contacting an irradiated target or material from an irradiated target with a solvent, such as aqua regia, to produce an irradiated target solution containing molybdenum-99 and zirconium. The molybdenum-99 then can be separated from other species in solution, such as zirconium species and incidental impurities or transmutation products. Purification can be accomplished by ion-exchange chromatography. For example, molybdenum-99 can be separated from zirconium by anion-exchange chromatography.

Some embodiments of the disclosed methods for making and purifying molybdenum-99 include contacting the irradiated target or material from the irradiated target with a fluorinating agent, such as $NF_3$ and/or HF. Fluorination of such materials can produce $MoF_5$, $MoF_6$ or both, as well as zirconium fluoride species. The molybdenum fluoride products $MoF_5$ and $MoF_6$ are relatively volatile at about ambient temperatures, whereas zirconium fluoride compounds produced by the process are non-volatile at about ambient temperatures. Thus, the desired molybdenum-99 material can be isolated by evaporation and condensation. Upon separation from the zirconium species, molybdenum fluorides optionally can be hydrolyzed to produce molybdate, which is typically the molybdenum species used to produce technetium-99m.

Also disclosed are targets for producing the disclosed radiopharmaceutical compositions. In certain embodiments, the targets are enriched in zirconium-96. The targets may take any suitable form to meet operational and production requirements. Certain target embodiments include target shapes and dimensions selected so that product yield and/or purification efficiency are optimized. In certain embodiments, the target comprises a disk, a ribbon, a wire or combinations of these forms. Because of the value associated with the target material, some embodiments are designed to enable the product to be harvested and the target to be subsequently re-irradiated for further product formation and harvesting.

One embodiment of a system for producing molybdenum-99 includes an alpha particle source for producing an alpha particle beam and a target comprising zirconium-96 arranged such that at least a portion of the alpha particle beam intersects the target. Any suitable charged-particle beam source can be used, including, without limitation, an alpha particle source comprising a table-top generator, a cyclotron or a linear accelerator. In certain embodiments of the system, a bath is provided for harvesting irradiated material from the target by chemical means. Mass difference means also can be used to harvest irradiated material from the target. Both of these harvesting methods, and several other harvesting methods, are suitable for continuous or near-continuous processing during irradiation, following irradiation, or both. For increased efficiency, the disclosed systems can include means for conducting the irradiation processes in a continuous mode or near-continuous mode by continuously exposing non-irradiated portions of the target (or starting material) to the charged-particle beam, which may be continuous or pulsed with a duty factor. In systems where the target is in a form of a disk or other rotatable shape, the process may be facilitated by rotating the target relative to the beam so that fresh material is thereby exposed. In some embodiments, the process includes harvesting irradiated target material at one location on the target while another portion of the target is being irradiated.

Also disclosed are compositions comprising molybdenum-99. For example, certain embodiments of the compositions can include 80% or greater abundances of molybdenum-99, and in some embodiments, the compositions include at least about 90% molybdenum-99. Such compositions also can include a carrier, such as a carrier gas. The carrier gas may comprise, e.g., helium, argon, combinations thereof and other suitable carriers.

Embodiments of the compositions disclosed herein include radiopharmaceutical compositions containing one or more of zirconium-96, molybdenum-99 and technetium-99m. In certain embodiments, the compositions include molybdenum-99 produced by the process described above.

The molybdenum-99 produced as described herein can be used to prepare a technetium-99m generator. Such generators are suitable for clinical use, for example, for use at hospitals to produce the disclosed radiopharmaceutical solutions. The preparation of the technetium-99m generator typically involves loading the purified molybdenum-99 onto an adsorbent column. After an appreciable amount of molybdenum-99 has decayed into technetium-99m, the technetium can be eluted from the column, thereby separating the molybdenum species from the technetium species.

Certain embodiments of the molybdenum and technetium compositions disclosed herein are substantially free of impurities, such as radioactive impurities. Some of the disclosed compositions include less than about $5\times10^{-2}$% percent radioactive impurities (by weight). Specifically, particular compositions are substantially free of actinides. Similarly, certain compositions are substantially free of radioactive isotopes of strontium, ruthenium, tellurium and iodine. One embodiment consists essentially of zirconium and molybdenum-99. In addition to the desired radioisotope, some embodiments of the disclosed compositions include at least one carrier. For example, radiopharmaceutical compositions and many of their precursor compositions can include a pharmaceutically compatible carrier.

DETAILED DESCRIPTION

Disclosed herein are methods, apparatus and systems for the production of radioisotopes, such as molybdenum-99. Also provided are novel medical radioisotope compositions and their precursors, including compositions comprising molybdenum-99, technetium-99m, or both.

It should be understood that when a particular isotope, such as molybdenum-99 or technetium-99m is referred to herein, compounds containing the particular isotope also are intended. With respect to molybdenum-99 and technetium-99m, such compounds can include, without limitation, molybdate ($MoO_4^{2-}$) salts, pertechnetate ($TcO_4^{1-}$) salts, chlorocomplexes of both and other chemical species.

Unless otherwise indicated, all numbers expressing quantities of ingredients, properties, thicknesses, power levels, and so forth used in the specification and claims are to be understood as being modified by the term "about" whether explicitly stated or not. Accordingly, unless indicated clearly to the contrary, the numerical parameters set forth are approximations.

I. INTRODUCTION

Figure 1:
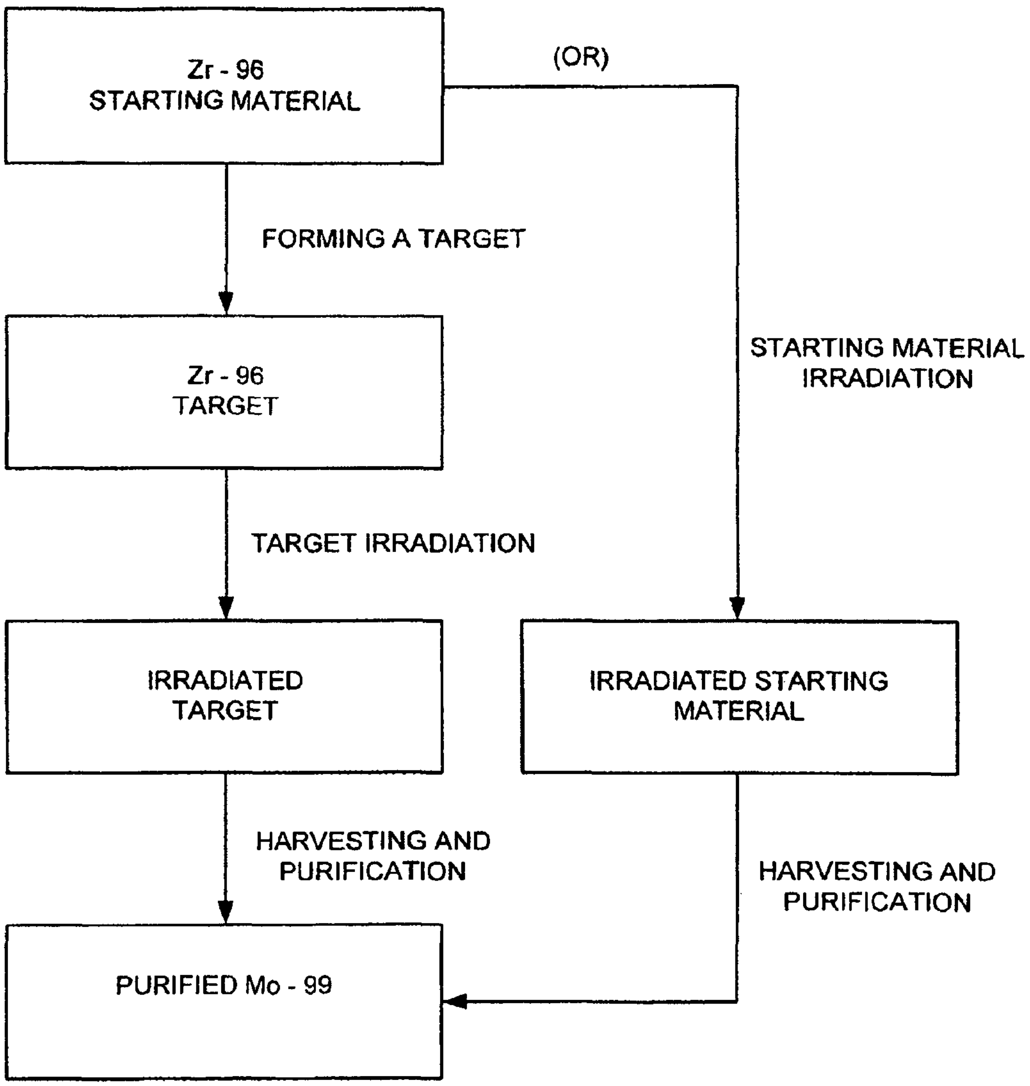
FIG. 1 is a flowchart illustrating certain embodiments of disclosed processes for preparing molybdenum-99.

The disclosed methods for making radioisotopes may include providing a starting material. For example, the disclosed methods for making molybdenum-99 and technetium-99m may include providing a zirconium-96-containing starting material. Some embodiments of disclosed methods for preparing molybdenum-99 are illustrated in FIG. 1. With reference to FIG. 1, these embodiments begin with a target containing zirconium-96. Irradiation of the target with alpha particles yields, via an alpha particle capture/neutron emission process, an irradiated target containing molybdenum-99. The irradiated target can be processed to harvest the irradiated material and purify the molybdenum-99. Alternatively, the starting material containing zirconium-96 can be irradiated without forming a target. As illustrated in FIG. 1, the starting material can be irradiated directly to produce molybdenum-99. The irradiated starting material also can be processed to purify molybdenum-99 from the remaining components of the starting material.

After molybdenum-99 is harvested from the target material or the starting material, it typically is loaded onto a technetium generator from which technetium-99m can be directly extracted by the end user. Typically, the molybdenum-99 product is purified to separate it from zirconium isotopes present in the irradiated target or irradiated starting material prior to loading onto the technetium generator. As is known in the art, technetium-99m can be separated as pertechnetate ($^{99m}TcO_4^{1-}$) from its parent hydrated molybdenum trioxide ($MoO_3$) or molybdate ion ($^{99}MoO_4^{2-}$) via column chromatography. Examples of technetium generators for purifying radiopharmaceutical quality technetium-99m produced from molybdenum-99 decay are described in U.S. Pat. No. 5,774,782 and in U.S. Patent Pub. No. 2003/0219366, both of which are incorporated herein by reference. Further variations of the processes, as well as other specific embodiments are set forth below.

II. TARGETS AND STARTING MATERIALS

In embodiments of the disclosed processes, the starting materials can be present in various compounds and compositions. For example, the starting materials can be in their natural abundance or enriched. Zirconium has a natural abundance of about 2.8% zirconium-96. Zirconium-containing materials can be used in embodiments of the disclosed methods without enrichment, as shown in Example 4, below. Zirconium-containing materials also can be enriched to higher abundances of zirconium-96. Enrichment, in particular embodiments, improves the yield of molybdenum-99 and, in certain embodiments, reduces the concentrations of undesirable impurities, such as molybdenum-93, in the product. In some embodiments, the concentration of zirconium-96 can range from greater than about 2.8% to greater than about 95%, such as from about 10% to greater than about 95%. Typically, when a target enriched in zirconium-96 is used, the zirconium includes at least about 10% of the zirconium-96 isotope, such as at least about 50% and, in some embodiments, at least about 90%.

Methods for preparing compounds enriched in zirconium-96 are known to those of ordinary skill in the art. For example, plasma separation is one technique that can be used to separate zirconium-96 from other zirconium isotopes. Plasma separation methods and apparatus are well known to those of ordinary skill in the art. For examples, see, Rosenthal et al., Localized Density Clumps Generated in a Magnetized Nonneutral Plasma. *Phys. Lett. A* 1992, 170, 443-447; Bauer et al., Experimental-Observation of Superstrong Electron-Plasma Waves and Wave Breaking. *Phys. Rev. Lett.* 1992, 68, 3706-3709; and U.S. Pat. No. 5,981,955 to Wong and Rosenthal. Zirconium-96 also can be obtained from spent nuclear fuel. In addition, zirconium compounds enriched in zirconium-96 are commercially available. For example, zirconium oxide enriched in zirconium-96 is commercially available at various enrichment levels. Zirconium oxide having 58.5% zirconium-96 is commercially available, for example, from STB Isotope, Hamburg, Germany, and zirconium oxide having over about 95% zirconium-96 is available, for example, from International Isotopes Clearing House Inc., Leawood, Kans., and from Chemotrade, Düsseldorf, Germany.

Any zirconium-96-containing starting material can be irradiated to produce molybdenum-99. Suitable starting materials include, without limitation, zirconium metal, zirconium nitride and zirconium oxide. Zirconium oxide is useful due to its ready availability, low cost and chemical stability. Zirconium metal also is readily available and, due to its ductility and malleability, is useful for fabricating into a desired target form. The starting material optionally can include other elements or compounds, such as other metals in addition to zirconium, to facilitate target construction.

Figure 2:
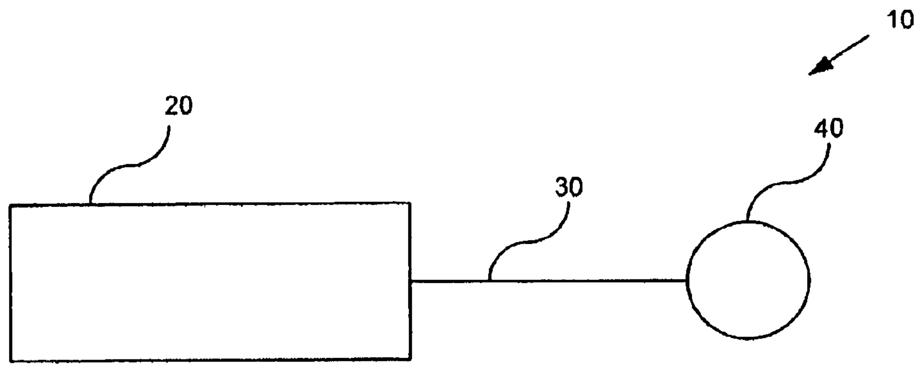
FIG. 2 is a diagram illustrating an embodiment of a system for producing radioisotopes.

The starting material can be fabricated into various target configurations to enhance the production and recovery of the desired species, such as molybdenum-99. These targets can be used in conjunction with an alpha-particle source. FIG. 2 illustrates one embodiment of a system 10 for producing radioisotopes, including a source 20, a beam 30 and a target 40.

The target can be in gaseous, liquid or solid form. Typically, the target is designed or adapted to dissipate excess heat and/or charge that builds up during irradiation. For example, the target can have a relatively large surface-area-to-volume ratio to favor heat dissipation and/or be thermally coupled to a heat-rejection medium, such as a gas (e.g., helium) or a liquid (e.g., water). Phase change reactions in the heat-rejection medium are particularly useful for absorbing heat generated by the irradiation process. In some embodiments, the heat-rejection medium is in the form of a mesh or screen comprising a material with high thermal conductivity. In these embodiments, the starting material can be, for example, placed in the interstices of the mesh or screen. Those skilled in the accelerator art know of additional methods for dissipating heat from the target, e.g. by design of the target. See, for example, Larsen et al., Evaluation of an Internal Cyclotron Target for the Production of $^{211}$At via the $^{209}$Bi ($\alpha$,2n) $^{211}$At Reaction. *Appl. Radiat. Isot.* 1996, 47, 135-143. To dissipate charge, the target can be, e.g., electrically coupled to ground.

The beam energy and target thickness may be selected such that the efficiency or economics of the overall process is optimal. For example, the path length of alpha particles within zirconium-96-containing materials is dependent upon the beam energy. Specifically, the path length of a 15 MeV beam of alpha particles within such materials is about 200 μm. In certain embodiments, the target is designed to have a thickness of about the alpha particle path length or less, such that the target is irradiated to its full thickness. In some such embodiments purification of the desired product is more efficient because less starting material remains in the target. In some embodiments, however, only the irradiated material is removed from the target for purification, which also simplifies purification of the desired product.

In certain embodiments, the target has a thickness substantially parallel relative to the beam vector or axis of less than about 1 mm and more typically has a thickness of from about 0.05 mm to about 0.5 mm. In particular embodiments, the target thickness is from about 0.2 to about 0.4 mm or from about 0.1 to about 0.2 mm. Thicker targets also can be used. Thicker targets are especially well-suited for dissipating heat generated by irradiation and for facilitating harvest of the desired product by mechanical processes. In some embodiments, the target has a thickness greater than about 1 mm, such as from about 1 mm to about 50 mm, from about 20 mm to about 40 mm, or from about 10 mm to about 20 mm. The desired thickness depends in part upon the energy level of the particle beam. Similarly, in some embodiments, the target has a width substantially perpendicular to the beam axis of less than about the beam diameter. Such dimensions are designed to result in a greater percentage of the target material being irradiated. As discussed above, this may simplify purification by reducing the amount of starting material that needs to be separated following irradiation. In one embodiment of a system for producing molybdenum-99, the alpha particle beam diameter is less than about 1 mm. The alpha particle beam diameter also can be greater than about 1 mm.

Figure 3A:
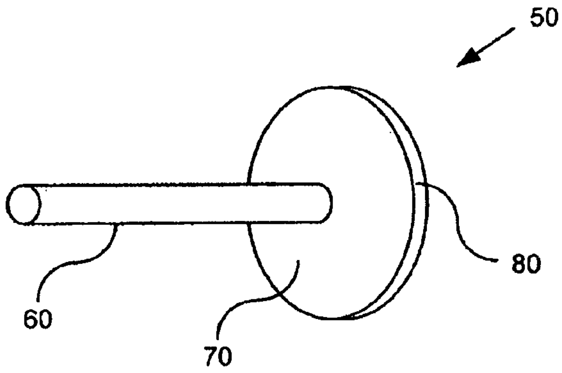
FIG. 3A is a perspective view of an embodiment of a target for the production of radioisotopes.
Figure 3B:
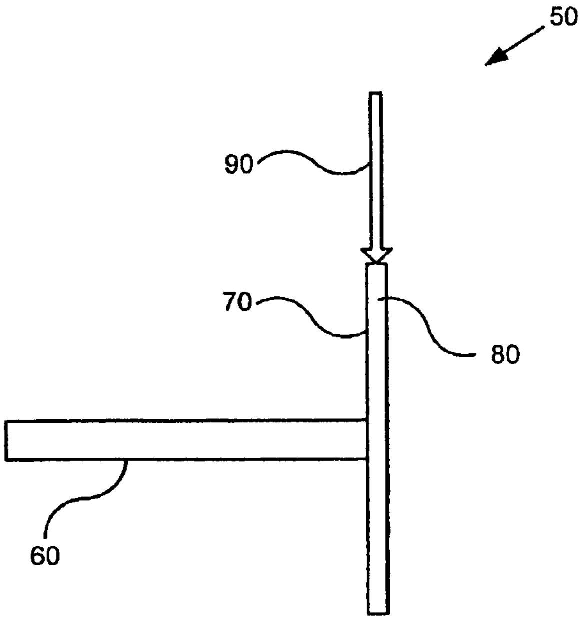
FIG. 3B is a side view of the target depicted in FIG. 3A.

One embodiment of a target well-suited for dissipating heat is depicted in FIG. 3A. The illustrated target assembly 50 includes a target formed into the shape of or onto a disk 70, which in turn can be mounted on a spindle 60. With reference to FIGS. 3A and 3B, the disk 70 includes an irradiation surface 80 arranged in an alpha beam path 90. Rotation of the disk 70 about the spindle 60 may place fresh portions of the irradiation surface 80 in the beam path 90. The spindle 60 optionally includes a ground connection (not shown) thus providing electrical coupling of the disk 70 to ground to dissipate charge accumulated during irradiation. Typically, the disk 70 has a diameter of from about 1 cm to about 30 cm, and in one embodiment, the disk 70 has a diameter of about 30 cm. Of course, the dimensions of the disk 70 are based on the other various parameters of the apparatus.

In another embodiment, the disclosed target can take the shape of or be formed into a ribbon, the ribbon, for example, being similar in shape to the shape of a piece of photographic film. The ribbon can be passed through an alpha particle beam at a rate suitable for producing useful amounts of the product, such as molybdenum-99. In this embodiment, the ribbon can, for example, be wound from one spool to another. As with the disk-shaped target discussed above, the target ribbon is well-suited to a continuous process wherein irradiated target material is harvested from an irradiated portion of the target ribbon while a second portion of the target ribbon is being irradiated. The ribbon can have a thickness similar to that discussed above in relation to the disk-shaped target, for example, 200 μm. The width of the ribbon may be comparable to the width of the alpha beam.

In certain embodiments, the target includes a substrate of a first material and is coated or in some manner combined with a layer of the starting material, such as a layer of zirconium-containing material. The substrate may comprise a flexible or rigid material depending upon the form the target is to take. The substrate material can be selected to have sufficient thermal conductivity to withstand the heat produced during alpha particle irradiation and can be selected to readily dissipate heat. The substrate also can be selected so that it does not produce undesirable transmutation products during irradiation. The layer of zirconium-containing material can have a thickness similar to that discussed above in relation to the disk-shaped target. In some disclosed embodiments, the substrate is coated with at least about 200 μm of a starting material, such as from about 200 μm to about 1 cm. The coating can have a thickness, for example, sufficient to substantially prevent alpha particles from reaching the substrate. The particle beam energy and other parameters can be set accordingly. In certain embodiments, such as where the target is a ribbon, the substrate can be selected such that the substrate and coating are sufficiently flexible to be wound about a spool. The substrate can be an inorganic material or materials, such as a metal, and/or can be an organic material or materials, particularly a synthetic material, such as a synthetic polymer.

Embodiments containing a substrate and a coating optionally can include an interlayer positioned between the substrate and the coating. In some embodiments, the interlayer is selected to improve adhesion between the substrate and the coating. Thus, such interlayers may be employed, for example, when the substrate and the coating do not adhere with sufficient affinity. In such cases, interlayer materials can be selected by a person of ordinary skill in the art such that the interlayer adheres to the substrate and the coating, thus effectively bonding the substrate and the coating. Combinations of coatings, substrates and interlayer materials can be selected for compatibility and appropriate physical properties by a person of ordinary skill in the art.

III. TARGET IRRADIATION

A variety of alpha particle sources are compatible with the disclosed methods. For example, a zirconium target can be irradiated with alpha particles using any alpha particle source to produce molybdenum-99. Alpha particle sources include cyclotrons, linear accelerators and table-top generators. Examples of suitable cyclotrons for use in embodiments of the disclosed methods include the Duke University Medical Center Cyclotron and the University of Washington's Scandatronix MC-50 cyclotron. In certain embodiments, an alpha particle generator, such as a table-top generator, is used to produce an alpha particle beam. Such alpha particle generators are known to those of ordinary skill in the art. For examples of table-top alpha particle generators, see, Ji et al., Production of Various Species of Focused Ion Beam, *Rev. Sci. Instrum.*, 2002, 73, No. 2, pp. 822-824, and Schneider, Operation of the Low-Energy Demonstration Accelerator: the Proton Injector for ATP, *Proc.* 1999 *IEEE Particle Accelerator Conf.*, pp. 503-507 (IEEE Catalog No. CH36366, 1999), both of which are incorporated herein by reference. One example of a suitable table-top generator is a multicusp plasma generator employing a multicusp ion source, which was developed at Lawrence Berkeley National Laboratory in Berkeley, Calif.

In principle, virtually any flux is acceptable for producing molybdenum-99, however, for commercial usage, the alpha particle beam flux typically is at least about $10^{16}$ $\alpha/(cm^2)s$. The alpha particle beam flux also may be less than about $10^{18}$ $\alpha/(cm^2)s$. For efficient transmutation of zirconium-96, in certain embodiments of the disclosed methods, the alpha particle beam has an energy of from about 10 to about 50 MeV, such as from about 10 to about 30 MeV. In certain embodiments, the alpha particle beam has an energy distribution centered at from about 10 to about 30 MeV, for example at about 14 MeV or about 15 MeV. In some cases, the beam can be substantially monoenergetic having a beam energy of about 14 MeV or about 15 MeV. A lower energy may be useful for reducing production costs. A person of ordinary skill in the art will be able to arrive at an optimum beam energy for a particular application by alpha transport modeling. Input parameters include the cross sections for the starting material, the initially-present impurities and the impurities formed by irradiation. The optimum beam energy can be higher or lower than the peak beam energy.

Although other flux levels may be used, when an alpha particle beam has a flux of about $10^{16}$ $\alpha/(cm^2)s$ and a beam energy of about 14 MeV, the target may be irradiated for a period of from about 2 hours to about 20 hours. In the production of molybdenum-99, such a target may have a zirconium-containing material thickness relative to a beam vector, for example, of about 100 μm or about 200 μm. Specific irradiation times, energy levels and flux levels can be selected by a person of ordinary skill in the art upon consideration of target system parameters, the target thickness and the desired product specifications.

Because alpha particles have a relatively short path length (of the order of about 200 μm) within the target material, the target can be relatively thin. With reference to FIGS. 3A and 3B, the disk 70 may have a thickness of starting material, such as Zr-containing material, of less than about 0.5 mm, and in some embodiments, a thickness of less than about 200 μm or even 100 μm. Such relatively thin targets generally effectively dissipate heat. Because only the outer few microns of the target may be effectively irradiated with alpha particles in certain embodiments of the disclosed method, only the first few atomic layers of the target need to be removed following irradiation.

Sputtering processes, such as focused ion beam mediated sputtering, are particularly useful for harvesting small amounts of irradiated material from the target. Irradiated material also can be removed by dissolving or contacting the irradiated material with a reagent. For example, in one embodiment, the irradiated area can be contacted with a reagent, such as aqua regia, to remove a portion of the target. Simple mechanical techniques also can be used to remove irradiated material from the target, as is known to those of ordinary skill in the art. For example, abrasion and/or mechanical skimming can be used to remove a portion of target material. Following removal of the irradiated material, the newly exposed target surface can be subjected to alpha particle irradiation and the process repeated to provide a continuous process.

IV. PRODUCT ISOLATION FROM IRRADIATED MATERIALS

Methods for isolating the product radioisotope from irradiated target and starting materials are described herein. These methods can be used alone or in combination to provide the desired compositions including the product, such as molybdenum-99.

In certain embodiments of the disclosed methods for the production of molybdenum-99, only the molybdenum-99 needs to be purified from the zirconium-containing target or starting material, because the irradiation process generally does not produce other products. Thus, in these embodiments, the crude mixture produced by irradiation primarily includes zirconium and molybdenum-99, and is relatively tractable compared to the mixture produced by the fission-based process.

One embodiment of the disclosed methods for purifying molybdenum-99 exploits the different solubilities of molybdenum and zirconium species in alkaline solution. This solubility-based method is compatible with the zirconium-based starting materials described above with respect to the target. One embodiment of this method includes the following basic steps: (1) contacting the irradiated target with aqua regia; (2) evaporating the aqua regia solution to dryness to yield a residue including molybdenum and zirconium species; (3) contacting the residue with an alkaline solution; and (4) separating the alkaline solution from the insoluble material. The molybdate salts are highly soluble at elevated pH, whereas zirconium oxides and hydroxides are not. In general, any pH above about 2 provides sufficient solubility differences to separate molybdenum compounds from zirconium compounds. In one embodiment, solutions having a pH of greater than about 6 can be used to separate molybdenum from zirconium. In such embodiments, sodium hydroxide solutions having a molarity of from about 0.2 to about 0.3 (or pH values of about 13.3-13.5) can be used for solubility-based separation. This method provides a purified solution containing molybdenum-99. The method also can be repeated one or more times, such as from one to five times, to increase the molybdenum purity. Typically, a single purification according to this protocol provides a composition including molybdenum-99 and containing less than about 1% zirconium. In certain embodiments, a single solubility-based purification procedure provides molybdenum-99 of analytical purity.

Some embodiments of the disclosed methods for purifying molybdenum-99 from irradiated target material involve ion-exchange chromatography. Molybdenum and zirconium species can be resolved according to embodiments of this method using either strongly basic or weakly basic ion-exchange resin. Suitable ion-exchange resins are well known to those of ordinary skill in the art and are commercially available. In general, the zirconium species exhibit a low affinity for anion-exchange resins until the acid concentration is greater than about 8 M. In contrast, molybdate exhibits a strong affinity for anion-exchange resins above an acid concentration of about 4 M, but a much lower affinity below this concentration. This acid-concentration dependent difference in affinity provides the basis for successful resolution of zirconium/molybdenum mixtures.

The ion-exchange purification can be repeated to form molybdenum-99 of increased purity. However, in certain embodiments, a single ion-exchange purification provides a decrease of from about two to about three orders of magnitude in zirconium. Typically, from one to five repetitions of the ion-exchange protocol results in molybdenum-99 of analytical purity. In one embodiment of a disclosed purification method, the ion-exchange protocol is performed in combination with the solubility-based protocol described above to provide purified molybdenum-99. In this tandem protocol, the solubility-based purification described above can be performed before or after the ion-exchange protocol.

Some embodiments of the disclosed methods include purifying molybdenum-99 from targets including zirconium species by fluorination. These embodiments take advantage of the different vapor pressures of molybdenum fluoride and zirconium fluoride species. For example, molybdenum pentafluoride ($MoF_5$) has a boiling point of 213° C. and molybdenum hexafluoride ($MoF_6$) has a boiling point of 34° C., whereas zirconium fluorides are non-volatile at these temperatures. In these embodiments, the irradiated target can first be subjected to exhaustive fluorination using a fluorinating agent. The resulting molybdenum fluoride can comprise, for example, about 80% or greater molybdenum-99. Any fluorinating agent can be used, including, without limitation hydrogen fluoride, nitrogen trifluoride, fluorine gas or combinations thereof. Other fluorinating agents can be substituted for hydrogen fluoride, nitrogen fluoride and fluorine, as is well known to those of ordinary skill in the art. The fluorinating agent can optionally be delivered in combination with a carrier, for example a carrier gas (such as helium, argon and the like) or a carrier solvent (such as water, fluorinated hydrocarbons or the like). As is known to those of ordinary skill in the art, solvents, including water and acetonitrile, can be used to modify the reactivity of the fluorinating agent.

In embodiments of the disclosed methods that use a fluorinating agent, the fluorinating agent can be activated either in situ or prior to contact with the irradiated target material. Any suitable activation method can be used, such as microwave activation, which generates free radicals via photon-induced homolysis of a bond.

Because molybdenum fluoride materials are relatively volatile, in comparison to zirconium fluoride materials, the desired molybdenum fluoride species can be isolated from the zirconium-based materials. An inert carrier gas, such as helium, a fluorocarbon (e.g., Freon) and/or argon can be used to flush away a molybdenum fluoride compound or compounds that are collected via, for example, a low-temperature trap.

Suitable apparatuses for performing the disclosed separation procedures are well known to those of ordinary skill in the art. A system for performing a fluorination process can include, for example, a filter positioned between a fluorination chamber and the low-temperature trap, e.g., below ambient temperature. This filter can be used to prevent solid materials, such as non-volatile zirconium species, from being swept into the low-temperature trap. When the molybdenum fluoride or fluorides have been isolated, they can be converted to molybdate salts via hydrolysis with an alkaline solution, such as a sodium hydroxide solution. The resulting material, a molybdate solution, can optionally be subjected to further purification, such as by ion exchange.

Embodiments of molybdenum-99 compositions produced according to certain variations of the disclosed methods may be substantially free of impurities that typically accompany fission-produced molybdenum-99 compositions. For example, fission-produced molybdenum-99 compositions can include one or more gamma particle emitters, such as iodine-131 (at levels of about $1.46\times10^{-7}$), iodine-132 (at levels of about $3.0\times10^{-5}$), ruthenium-103 (at levels of about $3.0\times10^{-5}$ or about $1.6\times10^{-7}$) and/or tellurium-132. Beta emitters, such as strontium-89 and strontium-90 also can be included in molybdenum-99 compositions produced by a fission process (in amounts as high as $5\times10^{-6}$) In certain embodiments, the disclosed molybdenum-99 compositions include other isotopes, such as molybdenum-93, molybdenum-93m, niobium-96, niobium-95, niobium-92, and/or strontium-89.

In certain embodiments of the molybdenum-99 compositions disclosed herein, the compositions have a higher activity concentration than molybdenum-99 compositions produced using a fission-based process. Pure molybdenum-99 has a specific activity (SPA) of $4.8\times10^{5}$ Ci/g. A fission reactor molybdenum-99 composition has a maximum SPA of $9.6\times10^{4}$ Ci/g at discharge and rapidly reduces to $1.6\times10^{4}$ Ci/g for a "7 day" molybdenum-99 composition. When 100% zirconium-96 material or even 70% zirconium-96-containing material is irradiated, as described above, the resulting molybdenum-99 composition can have a concentration of molybdenum-99 as much as four times greater than that of a fission reactor molybdenum-99 composition. Certain embodiments of the disclosed molybdenum-99 compositions have an activity concentration or an SPA value of at least about $19.2\times10^{4}$ Ci/g at discharge. For example, some embodiments of the disclosed molybdenum-99 compositions have an activity concentration or an SPA value of at least about $38.4\times10^{4}$ Ci/g at discharge.

The SPA values of a molybdenum-99 composition can be determined by calculating isotope cross sections using the Empire II Computer software code, available from, for example, The Nuclear Energy Agency, EMPIRE-II 2.18, Comprehensive Nuclear Model Code, Nucleons, Ions Induced Cross-Sections, at, for example, http://www.nea.fr/abs/html/iaea1169.html (Aug. 2, 2004), which is incorporated herein by reference. Using the initial enrichment amounts (e.g., 70% zirconium-96) for a given starting material, the isotope production value is calculated using an isotope generation and depletion code system, such as ORIGEN (a well-published code) developed for the Nuclear Regulatory Commission and the Department of Energy to satisfy a need for an easy-to-use standardized method of isotope depletion/decay analysis for spent fuel, fissile material, and radioactive material. ORIGEN computer software code solves equations of radioactive growth and decay allowing continuous first order chemical processing and a neutron flux described by a three-region spectrum. Complex decay and transmutation schemes can be treated. ORIGEN code is available from, for example, The Nuclear Energy Agency at http://www.nea.fr/welcome.html or from the Radiation Safety Information Computational Center (RSICC), at http://www-rsicc.ornl.gov/rsicc.html or http://www.ornl.gov/sci/origen-arp/origen-arp.html, all of which are incorporated herein by reference. The output from the isotope production code provides the mass (in grams) of all of the molybdenum isotopes produced. From this, the SPA can be calculated by multiplying $4.8\times10^{5}$ Ci/g by the mass of the molybdenum-99 divided by the mass of all the molybdenum isotopes including molybdenum-99.

Molybdenum-99 compositions produced as described above can be used to generate technetium-99m. In one embodiment of a method for producing technetium-99m, a chromatographic generator column is charged with an alumina adsorbent. The adsorbent is then equilibrated using a salt solution, such as an ammonium nitrate or saline solution. Particular examples use 0.1 M $NH_4NO_3$ for column equilibration. Molybdenum is loaded on the column as a $MoO_4^{2-}$ or hydrated $MoO_3$ solution, typically at a pH of from about 3 to about 4. This loading solution can be prepared, for example, by titrating about 1 mL of a 0.003 mg/L molybdenum-99 stock solution (ca. 3 mg) with 1 M $HNO_3$. Technetium-99m is eluted from the loaded column using a salt solution, such as, without limitation, 0.1 M $NH_4NO_3$, normal saline or both. The eluted technetium-99m solution may be used without further purification. However, in certain embodiments, the technetium-99m solution can be further purified by, for example, loading onto a technetium-99m concentrator column containing an anion-exchange resin, for example, AF W 1X8, 100-200 mesh in the $NO_3^-$ form (equilibrated with 0.1 M $NH_4NO_3$) or other anion-exchange resin known to those of ordinary skill in the art. The concentrator column typically is washed with a small amount of salt solution, such as 0.1 M $NH_4NO_3$, followed by a small amount of deionized water.

Technetium-99m can be eluted from the column using a reductive solution, such as a solution containing a complexing agent. In one embodiment, the reductive solution is prepared using an ethylenediamine (EDA) complexing agent. In one example, the reductive solution is prepared using about 0.004 parts $SnCl_2$, about 1 part 10% EDA/$H_2O$, about 1 part 0.1 M NaOH and about 10 parts deionized water. Other suitable complexing agents for eluting technetium-99 include molecules containing at least one amine, amide, ketone, carboxy, and/or sulfhydryl moiety. Particularly useful complexing agents are chelating agents that include at least two of these moieties.

As is known to those of ordinary skill in the art, the complexing agent, such as EDA, can be exchanged for another ligand. For example, upon acidification of a technetium-99m complex to a pH of about 4, the EDA ligand exchanges with other ligands, such as citrate or gluconate. Citrate and gluconate are typical ligands used in processes for labeling tissue specific targeting agents with technetium-99m.

V. EXAMPLES

The foregoing disclosure is further explained by the following non-limiting examples. Unless indicated otherwise, parts are parts by weight, temperature is given in Celsius or is at room temperature and pressure is at or near atmospheric.

Example I

This example describes the irradiation of a target comprising zirconium to produce a composition comprising molybdenum-99. A target of zirconium metal in the shape of a disk about one inch in diameter and about three millimeters thick was irradiated with an alpha particle beam having an energy of about 28 MeV using the University of Washington's Scandatronix MC-50 cyclotron for ca. 15 minutes. Analysis of the gamma spectrum of the irradiated target shows the presence of molybdenum-99, molybdenum-93m, niobium-96, niobium-95, niobium-92m, and strontium-89.

Example 2

This example demonstrates a method for isolating molybdenum-99 from an irradiated zirconium target. This exemplary method includes the following steps: (1) dissolving the irradiated target in aqua regia; (2) evaporating the aqua regia solution to leave a residue; (3) treating the residue with an alkaline solution; and (4) separating the soluble molybdenum species from the insoluble zirconium-containing material.

To demonstrate the effectiveness of this method, a 0.5333 g zirconium foil (99.7% purity, 0.2 mm thickness) and 0.0947 g $MoO_3$ were combined and treated with aqua regia (3:1 volume/volume solution of $HCl/HNO_3$ total volume of 6 mL). The mixture was heated gently for approximately 30 minutes to facilitate dissolution. A portion of the resulting solution—containing 0.048 grams of zirconium and 0.0032 grams of molybdenum—was placed in a glass beaker and evaporated to dryness using a hot plate. The residue was suspended in 5 mL of 0.25 M NaOH and heated to boiling for 20 minutes. After cooling, the suspension was centrifuged and the supernatant was analyzed using ICP-AES (inductively-coupled plasma-atomic emission spectroscopy). This analysis indicated that the supernatant had a molybdenum concentration of 0.45 g/L, which represented nearly 100% recovery of molybdenum. The zirconium concentration of the supernatant was less than 0.012 g/L. Thus, this example demonstrates that molybdenum-99 can be effectively separated from zirconium-containing materials by exploiting the different solubilities of molybdate salts and zirconium species in alkaline solutions.

Example 3

This example describes a method for purifying molybdenum-99 from zirconium-containing materials via ion-exchange chromatography. The irradiated target is dissolved in a suitable medium, such as aqua regia. The resulting solution is adjusted to be approximately 4 M in chloride. The solution is passed through an anion-exchange column and the column is washed with 4 M HCl to remove nitrate and residual zirconium. The desired molybdenum-99 product is eluted from the column using a dilute acid solution.

The efficacy of this purification method was demonstrated using a solution comprising both zirconium and molybdenum species. A 0.5333 gram zirconium foil (99.7% purity, 0.2 mm thickness) and 0.0947 gram $MoO_3$ were combined and treated with aqua regia (3:1 volume/volume solution of $HCl/HNO_3$ total volume of 6 mL). The mixture was heated gently for approximately 30 minutes to facilitate dissolution. The resulting solution was diluted with deionized water from its initial chloride concentration of 9 M to a chloride concentration of 4 M and a concentration of 10.4 mM Mo and 134 mM Zr. 11 mL of the diluted solution was applied to a column of strongly basic anion-exchange resin (BioRad AG1-X4, 50-100 mesh 13 grams, ca. 40 mL) and passed through the column at a rate of about 0.5 mL/minute. Then, about 50 mL of 4 M HCl ("scrub" solution) was passed through the column, followed by 60 mL of 0.04 M HCl ("strip" solution). The results of two trials performed according to this protocol are recorded in Table 1.

TABLE 1

| | Eluted Feed Solution (% Recovery) | Eluted Scrub Solution (% Recovery) | Eluted Strip Solution (% Recovery) |
|---|---|---|---|
| Trial 1: | | | |
| Mo | 0.18 | 0.07 | 0.12 |
| Zr | 102 | 1.7 | 0.024 |
| Trial 2: | | | |
| Mo | 0.1 | 0.08 | 0.01 |
| Zr | 94 | 13 | 0.07 |

The results recorded in Table 1 demonstrate that Zr species can be separated from Mo species using ion-exchange chromatography.

Several additional stripping conditions also were evaluated to improve the recovery of Mo from the ion-exchange resin. To evaluate Mo recovery conditions, an analyte solution (0.014 M molybdate) was prepared by dissolving ammonium molybdate (88 mg) in HCl (4 M; 50 mL). Each anion-exchange column was prepared using either strongly basic Bio-Rad AG1X4 (ca. 1 gram per column, 50-100 mesh, $Cl^-$ form, 5.5 meq reported capacity per gram of dry resin) or weakly basic BioRad AG3X4 (ca. 1.25 grams per column, 100-200 mesh, 5.5 meq reported capacity per gram of dry resin).

For each recovery assay, the resin was conditioned by passing several column volumes of feed solution (4 M HCl) through the resin. The analyte solution (1.5 mL) was added, followed by a feed solution (HCl 4 M). Following the addition of 10-15 mL of 4 M HCl, about 10-15 mL of deionized water (scrub) was added to the column, followed by 10-15 mL of the "strip" solution. The feed, scrub and strip effluents were separately collected and, following acidification by the addition of an equal volume of HCl (6M), were analyzed for sodium and molybdenum by ICP-AES. The results of this analysis for assays using the strongly basic AG1X4 resin are recorded in Table 2.

TABLE 2

| Strip Solution | % Mo in Feed Effluent | % Mo in Scrub Effluent | % Mo in Strip Effluent | Total % Mo Recovery |
|---|---|---|---|---|
| 0.25 M NaOH | 0.6 | 3.3 | 2.7 | 6.6 |
| 2.5 M NaOH | 0.08 | 1.4 | 72 | 73 |
| 1 M NaOH | 0.3 | 3.4 | 35 | 38 |
| 3:1 (v:v) 0.25 M NaOH/30% $H_2O_2$ solution | 0.3 | 0.2 | 67 | 67 |

The results recorded in Table 2 demonstrate that strongly basic anion-exchange resin retains molybdate from a 4 M HCl solution with high affinity. Moreover, hydroxide solutions or mixed $NaOH/H_2O_2$ solutions can be used successfully to recover molybdate during anion-exchange chromatography.

Weakly basic anion-exchange resin also can be used to separate zirconium from molybdenum. For example, BioRad AG3X4 weakly basic anion-exchange resin (10 grams, 100-200 mesh, 5.5 meq reported capacity per gram of dry resin) was loaded onto a 1.5 cm internal diameter column having, after loading, an approximately 25 mL dead volume. The column was equilibrated using 0.04 M HCl (ca. 25 mL) followed by 4 M HCl (ca. 20 mL). A diluted aqua regia solution containing molybdenum and zirconium (110.5 mL, prepared as described above) was added, followed by 50 mL of 4 M HCl, 20 mL deionized water, and 50 mL of 3 M NaOH. The results of this trial are recorded in Table 3.

TABLE 3

| | % in Feed Effluent | % in Scrub Effluent | % in Strip Effluent | Total % Recovered |
|---|---|---|---|---|
| Mo | 0.39 | 14 | 50 | 64 |
| Zr | 93 | 7.4 | 0.32 | 101 |

The Mo/Zr separation factor achieved in the above example is about 160. Thus, the results recorded in Table 3 demonstrate that weakly basic anion-exchange resin can be used to separate molybdenum species from zirconium species via anion-exchange chromatography.

Example 4

This example describes the production of $^{99}Mo$ via the alpha-particle bombardment of a natural zirconium target.

Copper (5N purity) and zirconium (3N purity) disks 2 inches in diameter and 0.125 inches thick were purchased from Electronic Space Products International (ESPI, Ashland, Oreg.) and were milled to 1 inch diameter. The disks were washed with a detergent solution to remove surface impurities, rinsed with tap water, and dried in air before use.

All bombardments were performed at the alpha accelerator at the University of Washington Department of Radiation Oncology using a stream (10 μA) of alpha particles of energy ~28 MeV. The metal disks (three copper, ~14.64 g; three zirconium, ~11.2 g) were placed individually in the sample holder of the accelerator so that the alpha beam was completely absorbed by the metal target. The copper and zirconium targets were bombarded for 2-3 and 10-15 minutes, respectively.

After irradiation, the targets were stored for approximately two days before being placed on an apparatus for gamma-energy analysis. The samples were counted at about 15 cm from the face of an intrinsic germanium detector. The analyses were performed using a Digital Spectrum Analyzer (Canberra) that had been setup and tested to correct accurately for system dead time for count rates much higher than those produced by the irradiated targets. The detector was calibrated with NIST-traceable standards with typical total propagated uncertainties of 1.5% at 1-sigma. The quoted uncertainties included all known sources of error including the counting statistics, calibration, and uncertainties in the half-lives and gamma intensities. Daily control counts were performed with $^{241}Am$, $^{60}Co$ and $^{137}Cs$ standards to verify the continuing detector calibration. All nuclear data were taken from tables (Browne and Firestone, 1986). $^{67}Cu$ and $^{67}Ga$ both have some of the same gamma ray emissions, but their relative gamma intensities are quite different. A simultaneous fit using the potential gamma emissions from both isotopes indicated virtually 100% of the gammas were emitted from $^{67}Ga$ with no $^{67}Cu$ activity. All data were corrected to an end of bombardment time on Jul. 26, 2004, at 9:21 am PDT.

The three copper targets were used as standards to verify the flux of the alpha-particle beam. Target Cu-1 was irradiated for 2 min; Cu-2 and Cu-3, for 3 min. The activities (Bq) of the radioisotopes that were produced during the relatively brief bombardments are listed in Table 4.

TABLE 4

| Radioisotope | Half-life | Cu-1 (Bq) | Cu-2 (Bq) | Cu-3 (Bq) |
|---|---|---|---|---|
| Zn-65 | 244.06 d | $2.60 \times 10^4 \pm 2.3\%$ | $3.77 \times 10^4 \pm 2.3\%$ | $3.92 \times 10^4 \pm 2.3\%$ |
| Ga-66 | 9.49 h | $1.17 \times 10^7 \pm 2.9\%$ | $1.65 \times 10^7 \pm 2.5\%$ | $1.72 \times 10^7 \pm 2.5\%$ |
| Cu-67 | 61.83 h | $<1.5 \times 10^3$ | $<1.5 \times 10^3$ | $<1.5 \times 10^3$ |
| Ga-67 | 3.2612 d | $8.99 \times 10^5 \pm 2.0\%$ | $1.36 \times 10^6 \pm 2.0\%$ | $1.40 \times 10^6 \pm 2.0\%$ |

The flux of the alpha-particle beam was calculated using the values for the quantities of radioisotopes produced, the known cross-sections for the (α,x) reactions on copper, and the time from end of bombardment. This flux then was used to calculate the cross-sections for (α,x) reactions on zirconium.

The three targets of natural zirconium were irradiated to provide data for determining the cross-section for $^{99}Mo$ production. Zirconium targets Zr-1 and Zr-3 were irradiated for 15 min; Zr-2, for 10 min. Table 5 lists the activities (Bq) of the radioactive isotopes that were produced directly after the end of bombardment.

TABLE 5

| Radioisotope | Half-life | Zr-1 (Bq) | Zr-2 (Bq) | Zr-3 (Bq) |
|---|---|---|---|---|
| Sr-89 | 50.53 d | $3.14 \times 10^4 \pm 3.0\%$ | $2.01 \times 10^4 \pm 2.6\%$ | $3.18 \times 10^4 \pm 2.5\%$ |
| Nb-92m | 10.15 d | $6.88 \times 10^4 \pm 2.3\%$ | $4.74 \times 10^4 \pm 2.6\%$ | $7.25 \times 10^4 \pm 2.2\%$ |
| Mo-93m | 6.85 h | $2.04 \times 10^7 \pm 3.5\%$ | $1.37 \times 10^7 \pm 3.6\%$ | $2.12 \times 10^7 \pm 3.6\%$ |
| Nb-95 | 34.991 d | $1.05 \times 10^4 \pm 2.7\%$ | $6.96 \times 10^3 \pm 3.5\%$ | $1.05 \times 10^4 \pm 2.8\%$ |
| Nb-96 | 23.35 h | $2.03 \times 10^5 \pm 1.6\%$ | $1.32 \times 10^5 \pm 1.4\%$ | $2.01 \times 10^5 \pm 1.5\%$ |
| Mo-99 | 65.94 h | $1.37 \times 10^5 \pm 1.9\%$ | $8.73 \times 10^4 \pm 2.1\%$ | $1.35 \times 10^5 \pm 1.9\%$ |

Natural zirconium can include $^{90}Zr$ (51.45%), $^{91}Zr$ (11.22), $^{92}Zr$ (17.15), $^{94}Zr$ (17.38) and $^{96}Zr$ (2.80). Considering the reactions that can occur during bombardment with alpha particles, the observed radioactive products were primarily as follows:

$^{90}Zr$ (α,d) $^{92m}Nb$
$^{90}Zr$ (α,n) $^{93m}Mo$
$^{91}Zr$ (α, α2p) $^{89}Sr$
$^{92}Zr$ (α,2n) $^{93m}Mo$
$^{92}Zr$ (α,p) $^{95}Nb$
$^{94}Zr$ (α,d) $^{96}Nb$
$^{96}Zr$ (α,n) $^{99}Mo$

The stable Mo products were primarily produced by the following reactions:

$^{90}Zr$ (α,2n) $^{92}Mo$
$^{91}Zr$ (α,n) $^{94}Mo$
$^{92}Zr$ (α,n) $^{95}Mo$
$^{92}Zr$ (α,2n) $^{94}Mo$
$^{94}Zr$ (α,n) $^{97}Mo$
$^{94}Zr$ (α,2n) $^{96}Mo$
$^{96}Zr$ (α,2n) $^{98}Mo$

By way of theory, many of the short-lived products also may have been formed because the beta-gamma dose rate of the targets decreased very quickly after the end of bombardment. However, the identities of these products could not be determined because the targets were allowed to cool for approximately two days before the gamma-energy analysis.

Figure 4:
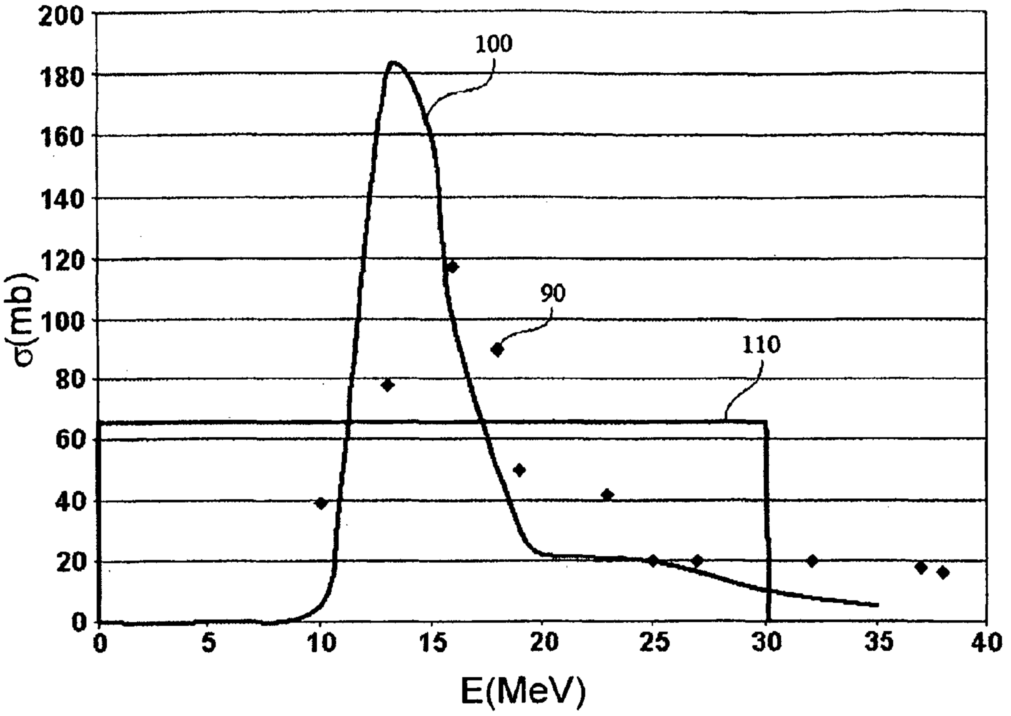
FIG. 4 is a chart of cross sections for an embodiment of a disclosed $^{96}$Zr (α,n) $^{99}$Mo reaction.

FIG. 4 shows the results from three measurements of the cross section for the $^{96}Zr$ (α,n) $^{99}Mo$ reaction. The previous experimental results (Chowdhury et al., 1995), represented by diamonds 90, indicated that the cross section is at least 120 mb with a peak near 15 MeV. Calculations performed using the EMPIRE-3 code, represented by line 100, indicated a cross-section value greater than 180 mb at about 14 MeV. The one-group thick-target cross section, represented by line 110, had an average effective cross-section of about 66 mb over the energy range 0-30 MeV.

The one-group thick-target cross section was derived as follows. The basic equations for the production (activity) of a radioactive isotope from a stable target for a given constant flux ($\phi$) and single cross section value ($\sigma_1$) are:

$$N_2(t) = \frac{N_1(0)\varphi\sigma_1}{\lambda_2}(e^{-\varphi\sigma_1 t} - e^{-\lambda_2 t}) \tag{1}$$

$$A_2(t) = \lambda_2 N_2(t) \tag{2}$$

$$\lambda_2 \ln 2 / t_{1/2} \tag{3}$$

where $N_2(t)$ is the number of atoms of isotope 2 (radioactive); $N_1(0)$, the initial number of atoms of isotope 1 (stable); $\phi$, the total particle flux; $\sigma_1$, the one-group effective capture cross section for isotope 1; $\lambda_2$, the decay constant for isotope 2; t, the irradiation time for production; $t_{1/2}$, the half life of isotope 2; and $A_2(t)$, the activity of isotope 2 at time t. Note that the above equations assume that the irradiation time is short enough such that there is no appreciable burnout of the target (isotope 1). For very short irradiation times ($t \ll t_{1/2}$ and $t \ll 1.0/\phi\sigma_1$) these equations give:

$$A_2(t) = N_1(0)\phi\sigma_1\lambda_2 t \tag{4}$$

Figure 5:
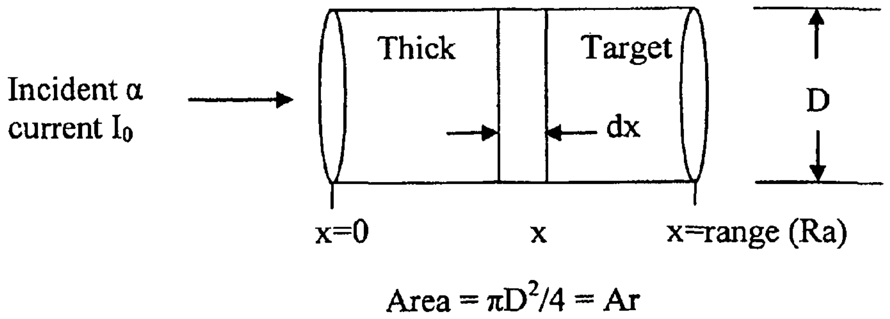
FIG. 5 is a diagram of a "thin" slice (dx) of a thick target with a face perpendicular to an alpha beam.

These same equations apply to situations involving one-group thick-target cross sections. First, they describe the thick target result, where $\sigma_1$ corresponds to the effective one-group cross section ($\sigma_1$) for a thick target and $\phi$, $N_1(0)$, and $A_2$ are the average flux ($\phi_{av}$), the number of target atoms, and the resulting activity for the whole thick target, respectively. Second, they give the activity produced ($dA_2$) in a "thin" slice (dx) of the thick target (FIG. 5) with a face perpendicular to the alpha beam and the dimensions of area (Ar) and length [range of alphas for incident energy at front face (Ra)] at a position along the x-axis (x), where the energy of the alpha particle is E(x) with a corresponding cross section $\sigma_1$ [E(x)]. The mass (dm) of the thin slice for very short irradiation times ($t \ll t_{1/2}$ and $t \ll 1.0/\phi\sigma_1$) is then:

$$dm = \rho Ar dx \tag{5}$$

where $\rho$ is the density (g/cc) of the thick target. From this the activity in the thin slice is:

$$dA_2 = dN_1(0)\varphi(x)\sigma_1(x)\lambda_2 t \tag{6}$$

$$dN_1(0) = dm(N_0 / Awt) \tag{7}$$

where $N_0$ is Avogadro's number ($6.02\times10^{23}$) and Awt is the atomic weight of the target. The flux $\phi(x)$ is assumed to be constant and given as:

$$\varphi(x) = I_0 / Ar \tag{8}$$

where $I_o$ is the incident current ($\alpha$/s) of $\alpha$-particles crossing the cylinder surface (area Ar) per unit time.

Combining Eqs. (5) to (8) then gives:

$$dA_2 = \left(\frac{N_0 I_0 \rho}{Awt}\right)\sigma_1(x)\lambda_2 t dx \tag{9}$$

Integrating Equation (9).

$$A_2 = \frac{N_0 I_0 \rho \lambda_2 t}{Awt}\int_0^{Ra} \sigma(E(x))dx \tag{10}$$

Given a "microscopic" (energy-dependent) cross section and the energy dependence E(x) as the alpha particle slows down in the thick target, Eq. (10) can be used to calculate the "total" activity produced for a given $\sigma(E(x))$. Using Equation (4) in terms of the one-group cross section results in:

$$A_2 = \frac{N_0 I_0 \lambda_2 t \rho}{Awt}\sigma_1 Ra \tag{11}$$

Hence:

$$\sigma_1 = \int_0^{Ra} \sigma(E(x))dx / Ra \tag{12}$$

As indicated above, in addition to the radioisotopes $^{93m}$Mo and $^{99}$Mo, irradiation of natural (or enriched) Zr will produce stable Mo isotopes. The stable isotopes of Mo are $^{92}$Mo, $^{94}$Mo, $^{95}$Mo, $^{96}$Mo, $^{97}$Mo, $^{98}$Mo, and $^{100}$Mo. The amount of these stable isotopes has a direct influence on the specific activity of the $^{99}$Mo product. Fission of $^{235}$U targets also produces stable isotopes of Mo so that the specific activity of fission $^{99}$Mo ($4.3\times10^4$ Ci/g at discharge) is significantly less than the theoretical value for pure $^{99}$Mo ($4.8\times10^5$ Ci/g).

The specific activity of $^{99}$Mo produced via the ($\alpha$,n) reaction was compared with that of fission $^{99}$Mo. The result of this comparison provides a clear indication of whether $^{99}$Mo from the ($\alpha$,n) reaction will behave similarly to fission $^{99}$Mo in existing $^{99}$Mo-$^{99m}$Tc column generators. Q values were computed for the reactions leading to Mo isotopes with the assumption that enriched $^{96}$Zr containing $^{92}$Zr (3%), $^{94}$Zr (27%), and $^{96}$Zr (70%) is available. The yields of both stable ($^{95}$Mo, $^{97}$Mo, $^{98}$Mo, and $^{100}$Mo) and radioactive $^{99}$Mo isotopes from the ($\alpha$,n) reaction with monoenergetic alpha particles of 11.0 and 15.0 MeV then were calculated. The calculated specific activities of the $^{99}$Mo product were $4.75\times10^5$ and $2.2\times10^5$ Ci/g, respectively. The value at 11.0 MeV was greater than that at 15.0 MeV because the cross sections for production of stable Mo isotopes are much lower at the lower energy. In any case, these specific activities were 5-10 times greater than that for fission $^{99}$Mo, indicating that unfavorable effects due to a large mass of Mo should not be a factor in using this $^{99}$Mo in the existing column generators.

Bombardment with alpha particles of a zirconium target including a significant amount of $^{96}$Zr is a viable method for producing $^{99}$Mo that can be used in $^{99}$Mo-$^{99m}$Tc generators. Since natural molybdenum includes $^{92}$Mo, $^{94}$Mo, $^{95}$Mo, $^{96}$Mo, $^{97}$Mo, $^{98}$Mo and $^{100}$Mo, the presence of any of these stable isotopes in the $^{99}$Mo product may reduce its specific activity. Thus, it is desirable to enrich the zirconium target as high as possible in $^{96}$Zr. This serves the purpose of decreasing the production of $^{93m}$Mo and stable molybdenum isotopes, both of which will compete with $^{99}$Mo for binding sites on the alumina column in the $^{99m}$Tc generator.

Example 5

Throughout this disclosure, the production of $^{99}$Mo is described in detail. The processes described above also can be applied to the production of other medically useful radioisotopes. This example describes the production of some of these additional radioisotopes. Table 6 includes a list of medically useful radioisotopes that can be produced by alpha-particle bombardment of various target materials.

TABLE 6

| Product | Half-life | Target | Natural Abundance % | Peak CS (mb) | Energy (MeV) |
|---|---|---|---|---|---|
| $^{123}I$ | 13.2 h | $^{121}Sb$ | 57.20% | 1278 | 29 |
| $^{124}I$ | 4.18 d | $^{121}Sb$ | 57.20% | 372 | 18 |
| $^{125}I$ | 59.4 d | $^{123}Sb$ | 42.80% | 1250 | 28 |
| $^{111}In$ | 2.80 d | $^{109}Ag$ | 48.20% | 1143 | 27 |
| $^{67}Cu$ | 2.58 d | $^{64}Ni$ | 0.93% | 80.7 | 20 |
| $^{201}Tl$ | 3.04 d | $^{198}Hg$ | 9.97% | 0.939 | 29 |
| $^{18}F$ | 1.83 h | $^{16}O$ | 99.80% | 124 | 33 |
| $^{18}F$ | 1.83 h | $^{15}N$ | 0.33% | 430 | 15 |
| $^{51}Cr$ | 27.7 d | $^{48}Ti$ | 73.70% | 694 | 14 |
| $^{66}Ga$ | 9.5 h | $^{63}Cu$ | 69.2% | 580 | 17 |
| $^{67}Ga$ | 3.26 d | $^{64}Zn$ | 48.00% | 471 | 20 |
| $^{67}Ga$ | 3.26 d | $^{65}Cu$ | 30.80% | 900 | 27 |
| $^{68}Ge$ | 270 d | $^{66}Zn$ | 27.90% | 551 | 31 |
| $^{82}Sr$ | 25.4 d | $^{80}Kr$ | 2.28% | 869 | 29 |
| $^{109}Cd$ | 461 d | $^{107}Ag$ | 51.80% | 6.6 | 30 |
| $^{211}At$ | 7.21 h | $^{209}Bi$ | 100% | 1080 | 31 |
| $^{99}Mo$ | 2.75 d | $^{96}Zr$ | 2.80% | 185 | 14 |
| $^{186}Re$ | 3.72 d | $^{183}W$ | 14.30% | 0.424 | 30 |
| $^{177}Lu$ | 6.65 d | $^{174}Yb$ | 31.80% | 0.095 | 25 |
| $^{103}Pd$ | 17.0 d | $^{100}Ru$ | 12.60% | 542 | 18 |
| $^{132}Cs$ | 6.48 d | $^{129}Xe$ | 26.40% | 3.1 | 25 |
| $^{153}Sm$ | 1.93 d | $^{150}Nd$ | 5.60% | 14.9 | 16 |
| $^{195m}Pt$ | 4.02 d | $^{192}Os$ | 40.80% | 26.5 | 21 |
| $^{47}Sc$ | 3.35 d | $^{44}Ca$ | 2.09% | 110 | 17 |
| $^{131}I$ | 8.02 d | $^{128}Te$ | 31.70% | 0.313 | 23 |
| $^{166}Ho$ | 1.12 d | $^{163}Dy$ | 24.90% | 0.16 | 24 |

The production of each of these radioisotopes can be optimized by a procedure similar to the procedure described above with respect to the production of $^{99}Mo$. For example, in each case, the cross sections of the impurities can be determined along with the cross sections of the radioactive and stable products. Using these cross sections, the energy of the alpha accelerator can be tuned to optimize production of the desired products. Where necessary, an appropriate separation process (e.g., chemical or physical) can be used to isolate the desired products after irradiation.

Figure 6:
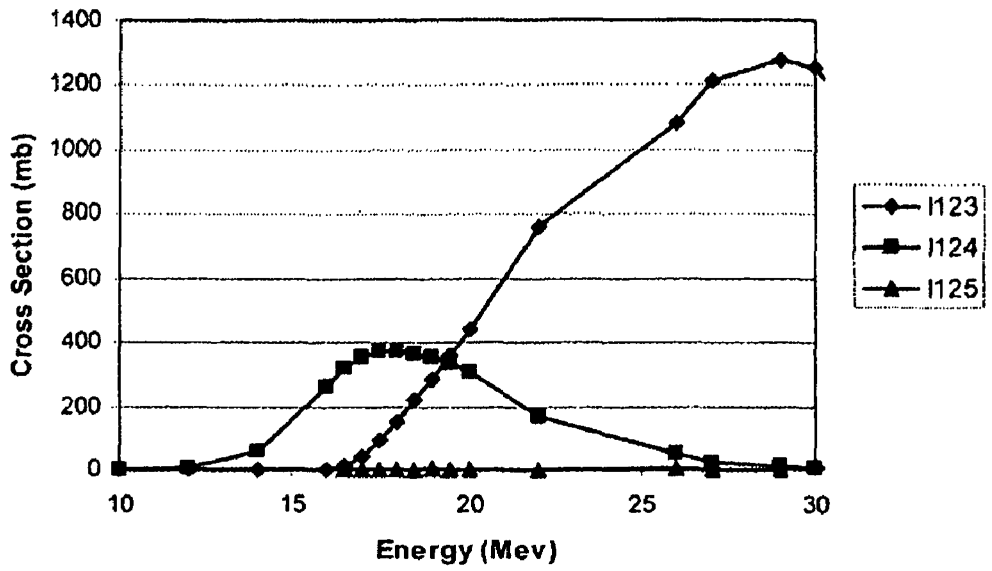
FIG. 6 is a chart of cross sections for an embodiment of a disclosed $^{16}$O (α,d) $^{18}$F reaction.
Figure 7:
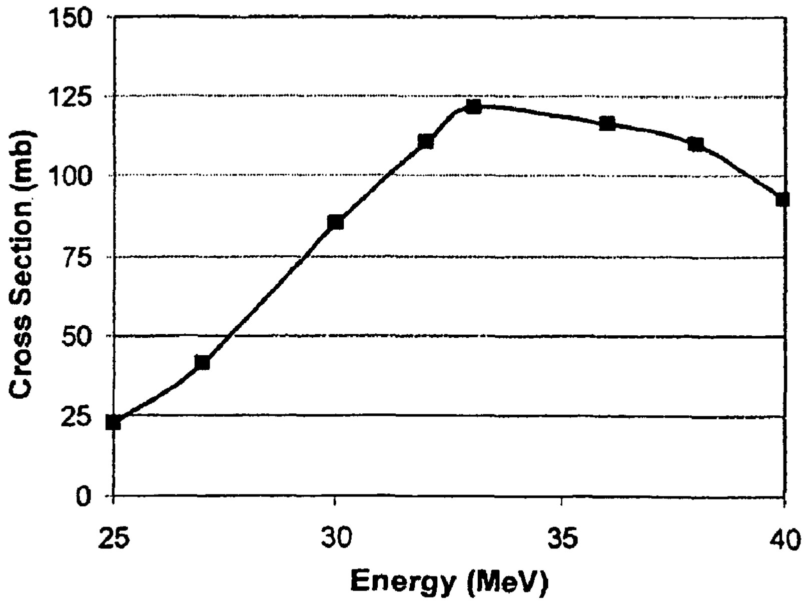
FIG. 7 is a chart of cross sections for three iodine isotopes produced by alpha irradiation of $^{121}$Sb.
Figure 8:
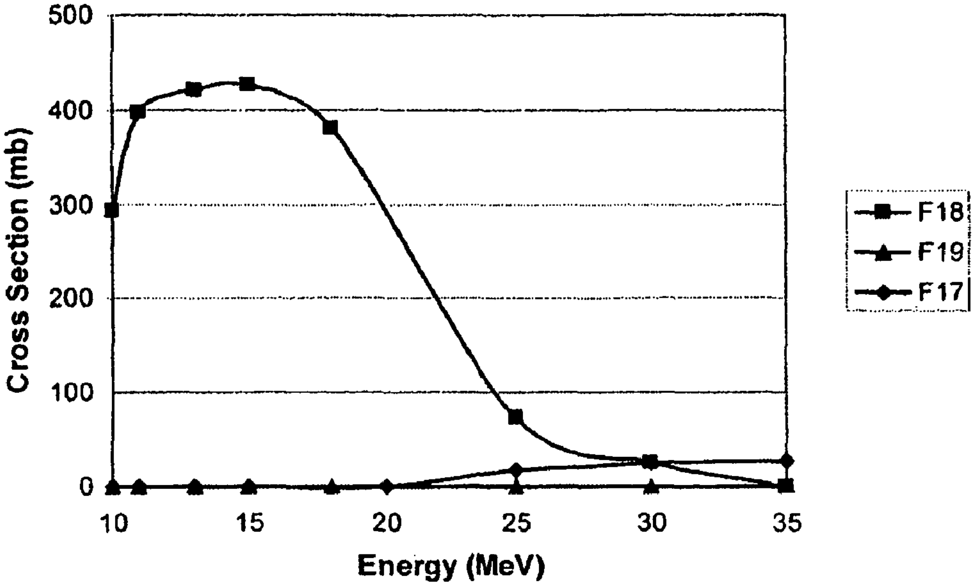
FIG. 8 is a chart of cross sections for three fluorine isotopes produced by alpha irradiation of $^{15}$N.

FIGS. 6, 7 and 8 show cross sections for isotopes resulting from alpha irradiation of $^{16}O$, $^{121}Sb$ and $^{15}N$, respectively. These cross sections can be used to optimize the production of the desired products. In many cases it is possible to use this optimization method to produce substantially carrier free product radioisotopes.

The present invention has been described with respect to certain preferred embodiments. However, the present invention should not be limited to the particular features described. Instead, the scope of the invention should be determined by the following claims.

We claim:

1. A process for producing molybdenum-99, comprising:
irradiating at least a portion of a zirconium target with alpha particles, thereby producing an irradiated target portion comprising molybdenum-99; and
separating the molybdenum-99 from other target species, wherein the irradiating and the separating occur simultaneously.

2. The process according to claim 1, wherein separating comprises chemical separation.

3. The process according to claim 1, wherein separating comprises mass difference separation.

4. The process according to claim 3, wherein the mass difference separation comprises plasma separation.

5. The process according to claim 1, wherein the irradiating at least a portion of the target includes exposing the target to an alpha particle beam having a flux of at least about $10^{16}$ $\alpha/(cm^2)s$.

6. The process according to claim 1, wherein the target comprises at least about 10% zirconium-96.

7. The process according to claim 1, further comprising purifying the molybdenum-99 to produce purified molybdenum-99.

8. The process according to claim 7, further comprising loading the purified molybdenum-99 onto an adsorbent column.

9. The process according to claim 8, further comprising allowing at least a portion of the purified molybdenum-99 to decay to technetium-99m.

10. The process according to claim 9, further comprising eluting the technetium-99m from the adsorbent column.

11. The process according to claim 1, further comprising producing technetium-99m from the molybdenum-99.

12. A process for producing molybdenum-99, comprising:
irradiating a first location of a zirconium target with alpha particles, thereby producing first irradiated target material comprising molybdenum-99, while simultaneously removing second irradiated target material from a second location of the target.

13. The process according to claim 12, wherein removing comprises contacting the second irradiated target material with a solvent, thereby producing an irradiated target solution.

14. The process according to claim 13, wherein the solvent is aqua regia.

15. The process according to claim 14, further comprising adjusting the concentration of the irradiated target solution to a chloride molarity of from about 4 to about 8 and subjecting the solution to ion-exchange chromatography.

16. The process according to claim 14, further comprising evaporating the aqua regia, thereby yielding a residue comprising zirconium and molybdenum-99.

17. The process according to claim 16, further comprising contacting the residue with an alkaline solution to selectively dissolve molybdenum species.

18. The process according to claim 12, wherein removing the second irradiated target material from the target comprises sputtering.

19. The process according to claim 18, wherein sputtering employs a focused ion beam.

20. The process according to claim 12, wherein removing the second irradiated target material from the target comprises mechanical milling.

21. The process according to claim 12, wherein removing and irradiating are performed in a continuous process.

22. The process according to claim 12, wherein alpha particles are within an alpha beam, and further comprising optimizing an energy of the alpha beam using alpha transport theory so as to maximize the production of molybdenum-99 and minimize the production of other products.

23. The process according to claim 12, further comprising producing technetium-99m from the molybdenum-99.

24. A process for producing molybdenum-99, comprising:
irradiating a zirconium target with alpha particles while contacting the irradiated target with a fluorinating agent; and
continuously adjusting the target such that different portions of the target are irradiated by alpha particles and contacted with the fluorinating agent, wherein the continuously adjusting occurs while continuously removing at least some irradiated target material from the target.

25. The process according to claim 24, wherein contacting the irradiated target with the fluorinating agent produces fluoride species comprising $MoF_5$, $MoF_6$ or both.

26. The process according to claim 25, wherein the fluorinating agent comprises at least one of $NF_3$ and HF.

27. The process according to claim 25, wherein contacting the irradiated target with the fluorinating agent comprises activating the fluorinating agent with microwave radiation.

28. The process according to claim 24, further comprising producing technetium-99m from the molybdenum-99.

29. A process for producing molybdenum-99, comprising:

positioning a zirconium target such that a portion of the target is irradiated by alpha particles from an alpha particle source, thereby producing irradiated target material comprising molybdenum-99; and continuously adjusting the target, the alpha particle source, or both the target and the alpha particle source such that a different portion of the target is irradiated by alpha particles, wherein the continuously adjusting occurs while continuously removing at least some of the irradiated target material from the target.

30. The process according to claim 29, further comprising purifying molybdenum-99 from the irradiated target material.

31. The process according to claim 30, wherein purifying molybdenum-99 comprises ion-exchange chromatography.

32. The process according to claim 30, wherein purifying molybdenum-99 comprises selectively dissolving molybdenum-99 in a solvent.

33. The process according to claim 30, wherein purifying molybdenum-99 comprises forming a molybdenum fluoride.

34. The process according to claim 29, further comprising producing technetium-99m from the molybdenum-99.

35. The process according to claim 29, wherein the continuously adjusting comprises moving the target in a cyclical pattern such that the removing exposes non-irradiated target material that is subsequently irradiated by the alpha particles.

36. The process according to claim 35, wherein the target comprises a rotating disk.

37. The process according to claim 35, wherein the target comprises a thin strip circulating in a loop.

* * * * *